United States Patent
Aoki et al.

(10) Patent No.: US 7,514,036 B2
(45) Date of Patent: Apr. 7, 2009

(54) HYDROGEN PERMEABLE ALLOY AND METHOD FOR PRODUCING THE SAME

(75) Inventors: Kiyoshi Aoki, Kitami (JP); Kazuhiro Ishikawa, Kitami (JP); Tsuyoshi Sasaki, Muroran (JP); Toshiki Kabutomori, Muroran (JP)

(73) Assignees: The Japan Steel Works, Ltd., Tokyo (JP); National University Corporation Kitami Institute of Technology, Hokkaido (JP)

( * ) Notice: Subject to any disclaimer, the term of this patent is extended or adjusted under 35 U.S.C. 154(b) by 365 days.

(21) Appl. No.: 11/390,218

(22) Filed: Mar. 28, 2006

(65) Prior Publication Data

US 2007/0056660 A1    Mar. 15, 2007

(30) Foreign Application Priority Data

Sep. 14, 2005    (JP)    ............................. 2005-266459

(51) Int. Cl.
*C22C 27/02*    (2006.01)
*C22C 30/00*    (2006.01)
*C22F 1/18*    (2006.01)

(52) U.S. Cl. ........................ 420/426; 420/580; 420/900; 148/422; 148/442; 148/668

(58) Field of Classification Search ................. 420/425, 420/426, 580, 900; 148/422, 442, 668; 429/218.2
See application file for complete search history.

(56) References Cited

FOREIGN PATENT DOCUMENTS

| EP | 1566457 A1 * | 8/2005 |
|---|---|---|
| JP | 11-276866 A | 10/1999 |
| JP | 2000-159503 A | 6/2000 |
| JP | 2004-42017 A | 2/2004 |

OTHER PUBLICATIONS

Gary J. Shiflet, "Glassy Metals", Kirk-Othmer Encyclopedia of Chemical Technology, Dec. 4, 2000, John Wiley & Sons, 9-13.*

* cited by examiner

*Primary Examiner*—Roy King
*Assistant Examiner*—Caitlin Fogarty
(74) *Attorney, Agent, or Firm*—Sughrue Mion, PLLC

(57) ABSTRACT

A (Nb, Ti) phase in an Nb—Ti—Co alloy is composed of a granular structure. The Nb—Ti—Co alloy is preferably subjected to heat treatment at 800° C. or more so that the eutectic structure in the casted state can be changed to a granular structure. The Nb—Ti—Co alloy used there is preferably $Nb_x Ti_{(100-x-y)} Co_y$, ($x \leq 70$, $20 \leq y \leq 50$ (mol %)). By properly predetermining the heating temperature and time, the resulting alloy exhibits improved hydrogen permeability in combination with a good hydrogen embrittlement resistance characteristic in the CoTi phase, making it possible to provide a practical hydrogen permeable membrane having an advantageously high performance.

6 Claims, 3 Drawing Sheets

HYDROGEN PERMEABLE ALLOY AND METHOD FOR PRODUCING THE SAME

This application is based on Japanese Patent Application No. 2005-266459, which is incorporated herein by reference.

BACKGROUND OF THE INVENTION

1. Field of the Invention

The present invention relates to a hydrogen permeable alloy as a hydrogen permeable membrane for use in the separation and purification of hydrogen.

2. Description of the Related Art

Highly pure hydrogen has been used to produce semiconductors, optical fibers and chemicals. The amount of highly pure hydrogen in use has been increasing every year. In recent years, hydrogen has also become known as a fuel for fuel cells. If fuel cells are used on a large scale in the future, highly pure hydrogen will be needed in large amounts. For this reason, it is desirable to develop a method capable of mass-producing hydrogen, including (1) a water electrolysis method involving the use of non-fossil fuel, and (2) a steam reforming method of hydrocarbon involving the use of fossil fuel. In regards to the electrolysis method (1), water electrolysis generation as an electric supply has been under study, but it is difficult to put it into practical use at the present technical level. Accordingly, at present it is most realistic to produce hydrogen by steam reforming hydrocarbons (2).

When producing hydrogen by stream reforming of hydrocarbons, the reaction system contains impure gases such as $CO$, $CO_2$, $H_2O$ and $CH_4$ in addition to a large amount of hydrogen. In order to utilize hydrogen as a raw material to be supplied to the fuel cell, hydrogen must be separated and purified from these impurities. Further, Pt electrodes in the fuel cell will undergo damage unless the content of CO in purified hydrogen is reduced to 10 ppm or less. In other words, in order to use hydrogen in the fuel cell, hydrogen must be purified to a high degree.

Examples of hydrogen purifying methods include the absorption method, cryogenic distillation method, and the membrane separation method. Among these, the most efficient method for producing highly pure hydrogen is the membrane separation method utilizing metals.

The mechanism of the permeation of hydrogen in the metallic membrane is described below. When a hydrogen pressure difference occurs across the metallic membrane, hydrogen molecules ($H_2$) are dissociated into hydrogen atoms (H) on the surface of the high pressure side of the metallic membrane. The hydrogen atoms are then dissolved into the metal. These hydrogen atoms permeate through the metallic membrane to the low pressure side, on which they are then combined to produce $H_2$ molecules which then come out of the metallic membrane. This results in the purification of hydrogen. The purification of hydrogen through a metallic membrane is characterized by an extremely great separation factor and permeability. The purification of hydrogen using a metallic membrane allows the purity of hydrogen to rise from about 99% to about 99.99999%. Accordingly, it can be said that the membrane separation method using a metallic membrane is suitable for the purification of hydrogen in order to produce highly pure hydrogen for fuel cells.

In regards to the hydrogen permeable membrane technique, the Pd alloy has been mainly put into practical use. However, when fuel cells are used on a large scale, a large amount of hydrogen will be needed. Accordingly, the demand for the Pd—Ag alloy as a hydrogen permeable metallic membrane will grow. If this happens, Pd, which is an expensive and scarce resource, will be the limiting factor that makes it impossible for the Pd alloy membrane to meet the industrial demand. Therefore, it is keenly desirable to develop substitute materials for the metallic membrane.

For example, JP-A-11-276866 discloses an alloy based on V, Nb or Ta. V, Nb and Ta are known to have excellent hydrogen permeability as compared with the Pd alloy. However, these elements have an extremely great hydrogen solubility and thus can easily undergo cracking due to hydrogen embrittlement when used in a simple substance. Therefore, it is necessary for these elements to be alloyed to have a reduced hydrogen solubility. In general, however, these elements exhibit deteriorated hydrogen permeability when they have a cracking resistance-enhancing element incorporated therein. JP-A-11-276866 makes no definite reference to the kind of additive elements and their use and thus cannot provide practical hydrogen permeable alloys excellent both in hydrogen permeability and cracking resistance.

In addition, JP-A-2000-159503 also discloses Nb-based hydrogen permeable alloys. In JP-A-2000-159503, it is assumed that these alloys occur in a single phase. However, it is difficult to cause a single phase to attain conflicting properties, i.e., hydrogen permeability and hydrogen embrittlement resistance. In order to attempt to inhibit the hydrogen embrittlement of these alloys, the hydrogen solubility of these alloys must be unavoidably lowered, causing the deterioration of hydrogen permeability.

As a means of inhibiting hydrogen embrittlement, JP-A-2004-42017 discloses a hydrogen permeable membrane made of an amorphous alloy. However, since the diffusion coefficient of hydrogen in an amorphous alloy is generally lower than that of crystalline materials, the proposed hydrogen permeable membrane cannot provide high hydrogen permeability. Further, since such an amorphous material undergoes crystallization when the temperature rises, the working temperature is limited. In particular, an amorphous alloy prepared for hydrogen permeation contains elements having a high bonding force to hydrogen and thus undergoes crystallization at lower temperatures in hydrogen.

In order to render a hydrogen permeable alloy excellent both in hydrogen permeability and hydrogen embrittlement resistance, the idea of a composite alloy has been proposed which causes different phases to attain hydrogen permeability and hydrogen embrittlement resistance. In this light, some of the present inventors propose an Nb—Ti—Co-based alloy. This alloy causes the (Nb, Ti) phase and the CoTi phase to attain hydrogen permeability and hydrogen embrittlement resistance, respectively, making it possible to attain hydrogen permeability and hydrogen embrittlement resistance which are equal to or better than that of Pd alloy membranes.

However, the related Nb—Ti—Co alloy leaves something to be desired in hydrogen permeability and thus needs to be improved in that aspect. In order to put the Nb—Ti—Co alloy into practical use, it is necessary to reduce the thickness of the Nb—Ti—Co alloy to scores of micrometers to form a foil. The method favorable for reducing the thickness of Nb—Ti—Co alloy is a method involving the repetition of cold rolling and annealing. However, it is unknown how the structural change caused by this method affects the hydrogen permeability.

SUMMARY OF THE INVENTION

The invention has been worked out under the following circumstances. The aim of the invention is to provide a hydrogen permeable alloy which has been microstructurally adjusted to have improved hydrogen permeability, and a method for producing the same.

According to a first aspect of the invention, the hydrogen-permeable alloy is an Nb—Ti—Co alloy having both hydrogen permeability and hydrogen embrittlement resistance, comprising an (Nb, Ti) phase having a granular structure.

According to a second aspect of the invention, the hydrogen permeable alloy comprises a multiphase including the (Nb, Ti) phase and a CoTi phase.

According to a third aspect of the invention, wherein the Nb—Ti—Co alloy is represented by the following general formula:

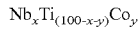

wherein x is not greater than 70 mol %; and y is from not smaller than 20 mol % to not greater than 50 mol %.

According to a fourth aspect of the invention, the method for producing a hydrogen-permeable alloy comprising heat treating an Nb—Ti—Co alloy so as to change the microstructure thereof to a granular structure.

According to a fifth aspect of the invention, it further comprising plastic working the Nb—Ti—Co alloy before the heat treating the Nb—Ti—Co alloy.

According to a sixth aspect of the invention, the Nb—Ti—Co alloy is represented by the following general formula:

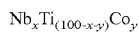

wherein x is not greater than 70 mol %; and y is from not smaller than 20 mol % to not greater than 50 mol %.

According to a seventh aspect of the invention, the heating temperature in a heat treatment is 800° C. or more.

In other words, the hydrogen permeable alloy of the invention has an (Nb, Ti) phase which is a granular structure that exhibits excellent hydrogen permeability. Furthermore, the provision of a multiphase of the (Nb, Ti) phase and CoTi phase makes it possible to obtain an excellent hydrogen embrittlement resistance in addition to the excellent hydrogen permeability. The (Nb, Ti) phase which is a granular structure is obtained by heat-treating an Nb—Ti—Co alloy which stays a lamellar eutectic structure in the casted state so that the eutectic structure is changed to a granular structure. Similar properties can also be obtained by subjecting the alloy to plastic working prior to heat treatment. Furthermore, excellent hydrogen permeability and hydrogen embrittlement resistance can be obtained by properly predetermining the temperature and time of the heat treatment.

The preferred proportion of the components of the Nb—Ti—Co alloy in its present application and the preferred conditions for preparation are described below.

The Nb—Ti—Co alloy of the invention is preferably represented by the general formula $Nb_xTi_{(100-x-y)}Co_y$. The reason for the predetermination of the proportion of the components of the alloy is described below.

(1) Nb: Nb≦70 mol %

The invention is characterized by the granular structure of the (Nb, Ti) phase, which contributes to hydrogen permeability. If the proportion of Nb is too great, the resulting alloy can easily undergo hydrogen embrittlement. Thus, the content of Nb needs to fall within the above range. For the same reason, the upper limit of the proportion of Nb is preferably predetermined at 60 mol %. On the contrary, when the proportion of Nb is too small, the resulting alloy has less granular structure and thus cannot exhibit sufficient hydrogen permeability. Therefore, the lower limit of the proportion of Nb is preferably 10 mol %, and more preferably, the lower limit of the proportion of Nb is 21 mol %.

(2) Co: 20 mol≦Co≦50 mol

When the proportion of Co is too small, the resulting alloy lacks the CoTi phase, which contributes to hydrogen embrittlement resistance, and thus cannot exhibit sufficient hydrogen embrittlement resistance. Accordingly, the proportion of Co needs to be 20 mol % or more. On the contrary, when the proportion of Co exceeds 50 mol %, the resulting alloy has too large an amount of a Co phase such as the CoTi phase, which doesn't contribute to hydrogen permeability. Therefore, the content of Co is preferably 25 mol %, and more preferably, the lower limit of the proportion of Co is 45 mol %.

(3) Heating temperature: 800° C. or more

Since the atoms constituting the (Nb, Ti) phase diffuse over a long distance to cause the change of the structure of the material, the heat treatment needs to be effected at a temperature of 800° C. or more. Furthermore, the upper limit of the temperature of the heat treatment is limited to the melting point. Accordingly, the heat treatment temperature of the present alloy is predetermined to be from not lower than 800° C. to the melting point.

As mentioned above, the hydrogen permeable alloy of the invention is an Nb—Ti—Co alloy having both hydrogen permeability and hydrogen embrittlement resistance wherein the (Nb, Ti) phase is composed of a granular structure. Thus, excellent hydrogen permeability can be obtained without impairing hydrogen embrittlement resistance.

In accordance with the method for producing a hydrogen permeable alloy of the invention, the Nb—Ti—Co alloy is subjected to heat treatment so that the casted eutectic structure in the alloy is changed to a granular structure by heating, making it possible to further enhance the hydrogen permeability of an Nb—Ti—Co alloy having both hydrogen permeability and hydrogen embrittlement resistance.

In order to put the hydrogen permeable alloy to practical use, it is necessary for the alloy be worked to a foil having a thickness of scores of micrometers. The most practical way to form a casted ingot into a foil, is to effect cold rolling and annealing repeatedly. When a casted ingot is processed in this manner, the (Nb, Ti) phase, which exhibits a lamellar structure in the casted state, is changed to a granular structure. By properly predetermining the temperature and time of heating, the hydrogen permeability of the alloy can be enhanced, making it possible to provide a practical hydrogen permeable membrane having an advantageously high performance.

DETAILED DESCRIPTION OF THE PREFERRED EMBODIMENTS

Figure 1:
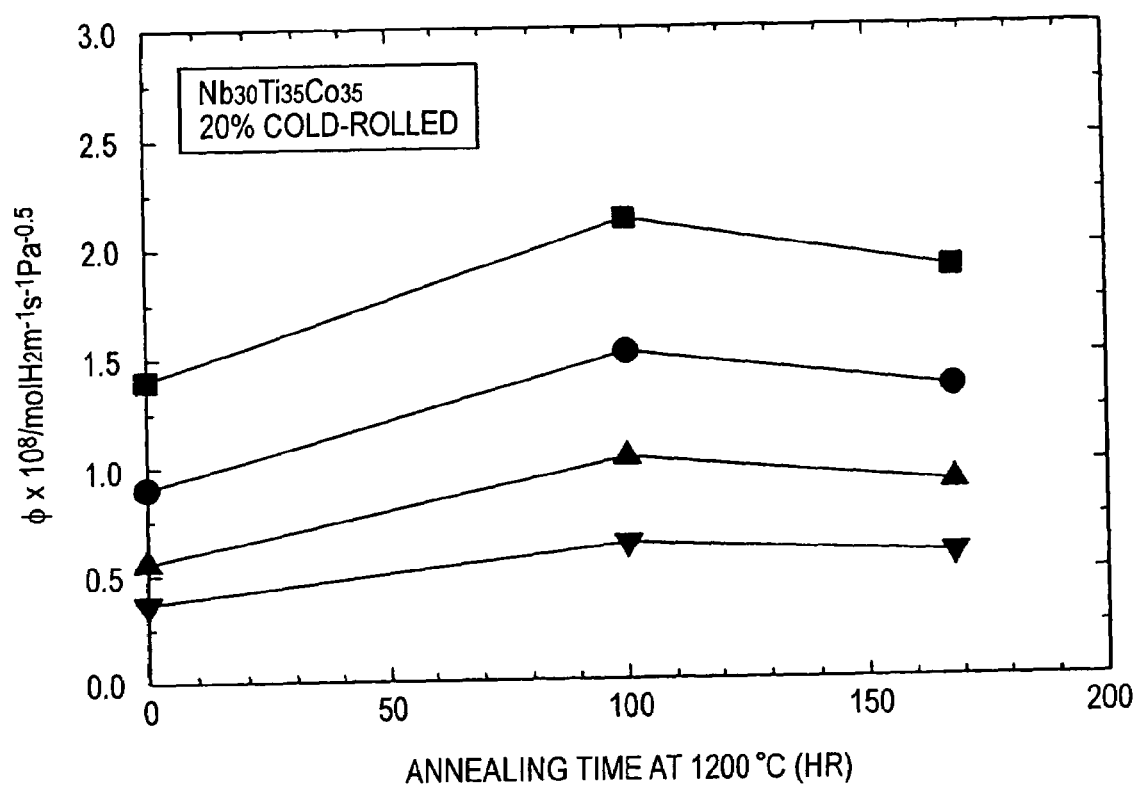
FIG. 1 is a graph illustrating the change of the hydrogen permeability of 20% cold-rolled $Nb_{30}Ti_{35}Co_{35}$ with heat treatment.

The hydrogen permeable alloy of the invention can be prepared by ordinary methods. More specifically, the proportions of the elements Nb, Ti, Co are properly adjusted to prepare the desired alloy. The preferred general formula of the alloy is represented by $Nb_xTi_{(100-x-y)}Co_y$ (x≦70, 20≦y ≦50 (mol %)).

The hydrogen permeable alloy may be subjected to cold rolling as necessary. The percent of rolling reduction during cold rolling is not specifically limited herein. The alloy may be rolled to a foil having a thickness of 100 μm or less.

Furthermore, the aforementioned alloy may be subjected to heat treatment so that the (Nb, Ti) phase which stays a lamellar eutectic structure in the casted state can be changed to a granular structure. The heat treatment temperature is 800° C. or more and the heat treatment time is long, enough to give a driving force for changing the lamellar eutectic structure to a granular structure.

In this manner, a hydrogen permeable alloy having an (Nb, Ti) phase, which is a granular structure, and a CoTi phase can be obtained. The obtained alloy can be provided with a good workability and thus can be worked to a shape suitable for hydrogen permeability with various uses. The hydrogen permeable material exhibits excellent hydrogen permeability as well as excellent resistance to embrittlement caused by the permeation of hydrogen.

EXAMPLE

As Nb—Ti—Co alloys, alloy ingots composed of $Nb_{30}Ti_{35}Co_{35}$ and $Nb_{40}Ti_{30}Co_{30}$ were prepared by arc melting. Each of the prepared alloy ingots were then worked into sheets having a thickness of about 1 mm using a wire electric discharge machine. Some of these sheets were subjected to cold rolling at a percent working of 20%. These sheets were then heated in vacuo. The heating temperature was 1,200° C. and the heating time was from 24 hours to 168 hours. In particular, Comparative Example 1 and Examples 1 and 2 relate to $Nb_{30}Ti_{35}Co_{35}$. Among them, Comparative Example 1 was subjected to rolling alone and Examples 1 and 2 were subjected to heat treatment for 100 hours and 168 hours after rolling, respectively. Comparative Examples 2 and 3 and Examples 3 to 7 relate to $Nb_{40}Ti_{30}Co_{30}$. Among them, Comparative Example 2 was subjected to neither heat treatment nor rolling, Examples 3 and 4 were subjected to heat treatment for 100 hours and 168 hours, respectively, and Comparative Example 3 was subjected to rolling alone and Examples 5 to 7 were subjected to heat treatment for 24 hours, 100 hours and 168 hours after rolling, respectively.

Each of the test specimens were then observed for the microstructure of (Nb, Ti) phase under a scanning electron microscope. As a result of the microstructural observation, a granular structure, a mixture of granular structure and lamellar structure, and a lamellar structure were observed. The results are set forth in Table 1.

The test specimens thus processed were each worked into a disc having a diameter of 12 mm, mirror-polished on both sides, and then sputtered with Pd to form a Pd deposit thereon to a thickness of about 200 nm so that their surfaces were rendered oxidation-inhibitive and catalytic for hydrogen dissociation and recombination. In this way, test specimens were prepared. These test specimens were each set in a hydrogen permeation testing apparatus in which the air within was then evacuated. Then each test specimen was heated to 400° C. When the temperature in the testing apparatus reached 400° C., hydrogen was then supplied into the testing apparatus. Under these conditions, the hydrogen permeation rate was then measured while the pressure at the secondary side and at the primary side was kept at 0.1 MPa and 0.2 MPa, respectively. The hydrogen permeation rate was measured in each case as the primary side pressure was raised stepwise up to 0.65 MPa. The measurement of the hydrogen permeation rate at 400° C. was followed by the measurement of the hydrogen permeation rate at 350° C., 300° C. and 250° C. in the same manner as mentioned above.

The relationship between the hydrogen permeability (Φ) set forth in Table 1, and the hydrogen permeation rate is represented by the following equation (1):

$$\Phi = J \times L / A / (P_1^{0.5} - P_2^{0.5}) \quad (1)$$

wherein J represents the hydrogen permeation rate; L represents the thickness of the specimen; A represents the permeation area; $P_1$ represents the hydrogen pressure at the primary side; and $P_2$ represents the hydrogen pressure at the secondary side.

Accordingly, when the data obtained at varying primary side pressures are plotted with $A \times (P_1^{0.5} - P_2^{0.5})$ as the abscissa and $J \times L$ are the ordinates, a linear relationship with respect to the various temperatures can be established. The slope of the straight line is defined to be Φ. This relationship was then utilized to determine the hydrogen permeability (Φ) at the various temperatures. The various test specimens were then compared with respect to the hydrogen permeability.

Figure 2:
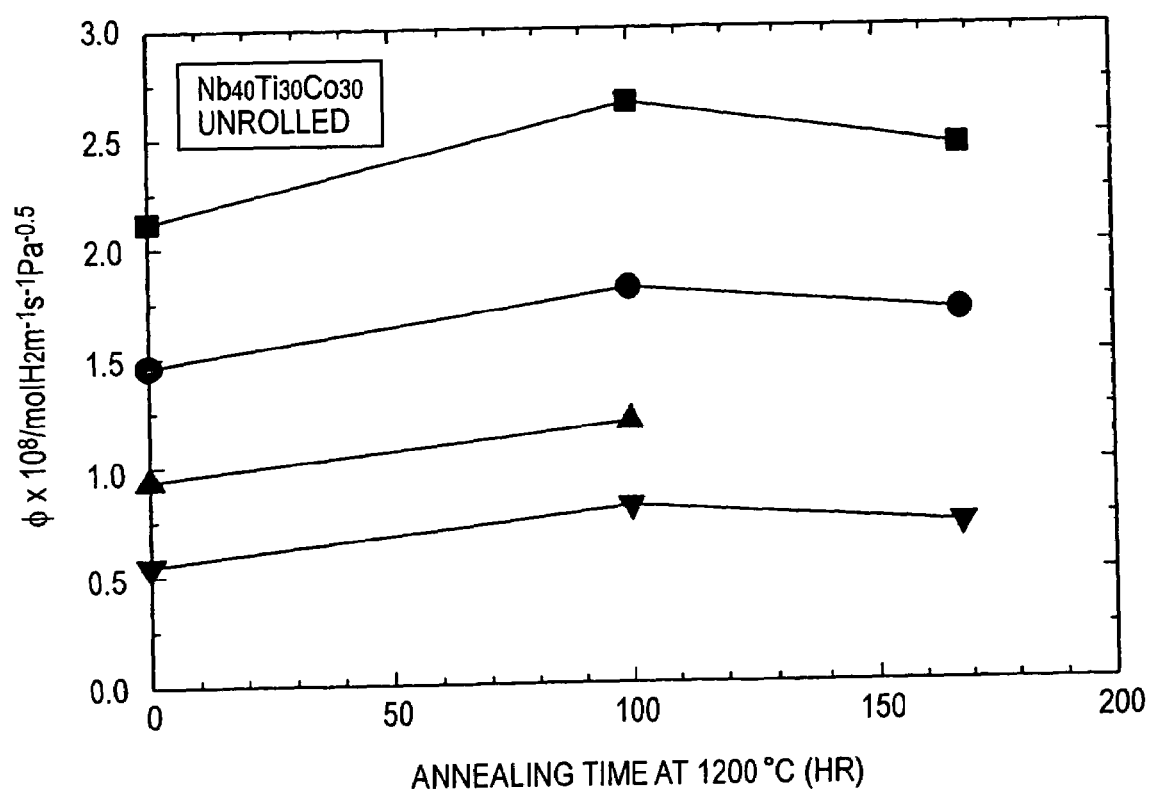
FIG. 2 is a graph illustrating the change of the hydrogen permeability of unrolled $Nb_{40}Ti_{30}Co_{30}$ with heat treatment.
Figure 3:
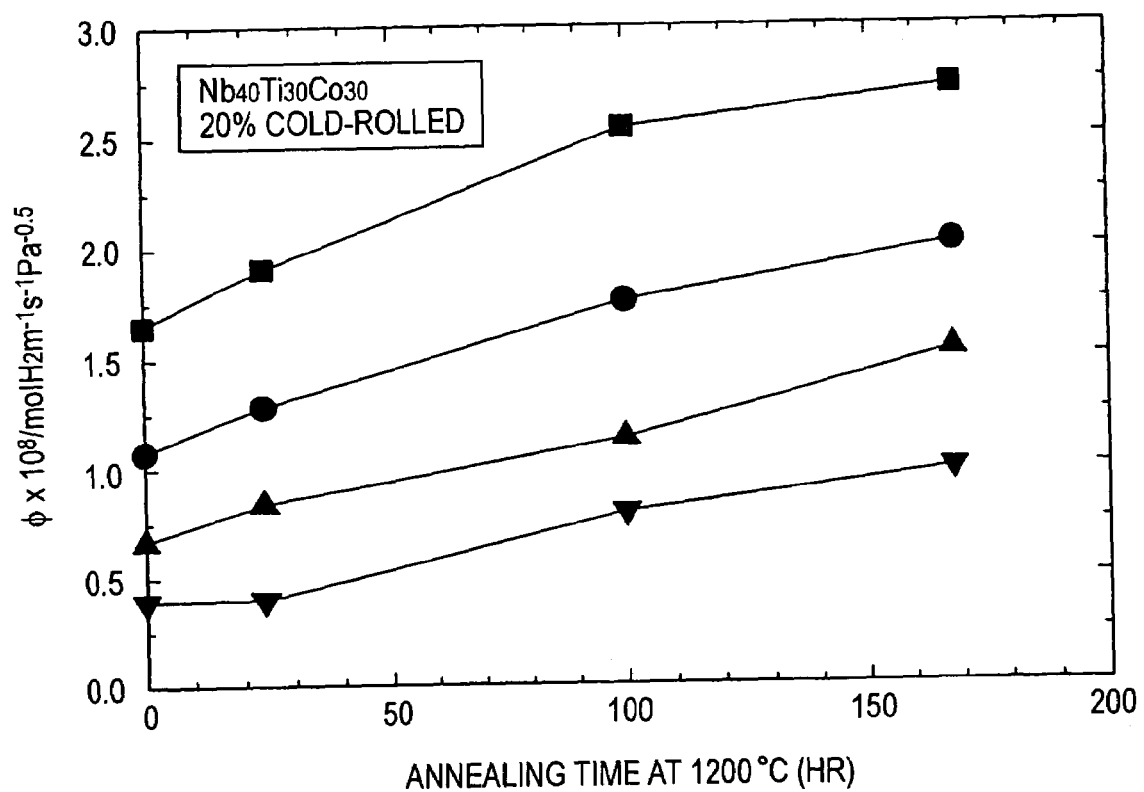
FIG. 3 is a graph illustrating the change of the hydrogen permeability of 20% cold-rolled $Nb_{40}Ti_{30}Co_{30}$ with heat treatment.

All of these results are set forth in Table 1. FIGS. 1 to 3 depict the change of hydrogen permeability with heating time.

None of these alloys underwent cracking even when the specimens had hydrogen incorporated therein. All of these alloys exhibited good hydrogen embrittlement resistance. Among these alloys, the alloys of Examples 1 to 7 exhibited a granular structure and hence a good hydrogen permeability. On the contrary, the alloys of Comparative Examples 1 to 3 exhibited a lamellar structure or a lamellar structure and a granular structure in admixture and hence a low hydrogen permeability. Thus, the alloy is preferably heated to obtain a granular structure. In this manner, even when the alloy is subjected to plastic working such as rolling before heating, a good hydrogen permeability can be obtained.

TABLE 1

| Formulation | Cold-rolled? | Heating time (hr) | $\phi$ ($10^{-8}$ $molH_2m^{-1}s^{-1}Pa^{-0.5}$) | | | | (Nb, Ti) phase | Remarks |
|---|---|---|---|---|---|---|---|---|
| | | | 400° C. | 350° C. | 300° C. | 250° C. | | |
| 30Nb | Yes | Not heated | 1.4 | 0.9 | 0.56 | 0.37 | Lamellar | Comparative Example 1 |
| | | 100 | 2.13 | 1.52 | 1.03 | 0.64 | Granular | Example 1 |
| | | 168 | 1.9 | 1.36 | 0.913 | 0.59 | Granular | Example 2 |
| 40Nb | No | Not heated | 2.11 | 1.46 | 0.94 | 0.55 | Multiphase | Comparative Example 2 |
| | | 100 | 2.66 | 1.81 | 1.2 | 0.811 | Granular | Example 3 |
| | | 168 | 2.45 | 1.7 | — | 0.728 | Multiphase | Example 4 |
| | Yes | Not heated | 1.65 | 1.08 | 0.668 | 0.392 | Granular | Comparative Example 3 |

TABLE 1-continued

| Formulation | Cold-rolled? | Heating time (hr) | $\phi$ ($10^{-8}$ molH$_2$m$^{-1}$s$^{-1}$Pa$^{-0.5}$) 400° C. | 350° C. | 300° C. | 250° C. | (Nb, Ti) phase | Remarks |
|---|---|---|---|---|---|---|---|---|
| | | 24 | 1.91 | 1.29 | 0.84 | 0.4 | Granular | Example 5 |
| | | 100 | 2.55 | 1.76 | 1.14 | 0.798 | Granular | Example 6 |
| | | 168 | 2.73 | 2.03 | 1.54 | 0.99 | Granular | Example 7 |

* 30Nb indicates Nb$_{30}$Ti$_{35}$Co$_{35}$ and 40Nb indicates Nb$_{40}$Ti$_{30}$Co$_{30}$. The term "multiphase" as used in the table above is meant to indicate "lamellar phase and granular phase in admixture".

What is claimed is:

1. A hydrogen permeable Nb—Ti—Co alloy having both hydrogen permeability and hydrogen embrittlement resistance, comprising a multiphase including a CoTi phase and an (Nb, Ti) phase having a granular structure.

2. The hydrogen permeable alloy according to claim 1, wherein the Nb—Ti—Co alloy is represented by Nb$_x$Ti$_{(100-x-y)}$Co$_y$, and wherein x is not greater than 70, and y is from not smaller than 20 to not greater than 50.

3. A method for producing a hydrogen permeable alloy, Nb—Ti—Co alloy having both hydrogen permeability and hydrogen embrittlement resistance, said alloy comprising a multiphase including a CoTi phase and an (Nb, Ti) phase having a granular structure, said method comprising heat treating an Nb—Ti—Co alloy so as to change the structure thereof to a granular structure.

4. The method for producing a hydrogen permeable alloy according to claim 3, further comprising plastic working the Nb—Ti—Co alloy before the heat treating the Nb—Ti—Co alloy.

5. The method for producing a hydrogen permeable alloy according to claim 3, wherein the Nb—Ti—Co alloy is represented by Nb$_x$Ti$_{(100-x-y)}$Co$_y$, and wherein x is not greater than 70, and y is from not smaller than 20 to not greater than 50.

6. The method for producing a hydrogen permeable alloy according to claim 3, wherein a heating temperature in the heat treatment is 800° C. or more.

* * * * *